United States Patent [19]

Tanaka et al.

[11] Patent Number: 5,360,890
[45] Date of Patent: Nov. 1, 1994

[54] REFINING OF POLYARYLENE SULFIDES

[75] Inventors: Shinji Tanaka; Hiroshi Inoue, both of Mie, Japan

[73] Assignee: Tosoh Corporation, Yamaguchi, Japan

[21] Appl. No.: 171,845

[22] Filed: Dec. 22, 1993

Related U.S. Application Data

[63] Continuation of Ser. No. 928,024, Aug. 11, 1992, abandoned.

[30] Foreign Application Priority Data

Aug. 14, 1991 [JP] Japan ................... 3-228669

[51] Int. Cl.$^5$ ............................................. C08G 75/16
[52] U.S. Cl. .................................... 528/388; 528/501;
528/373; 525/537
[58] Field of Search ............... 528/388, 373; 525/537

[56] References Cited

U.S. PATENT DOCUMENTS

| | | | |
|---|---|---|---|
| 4,415,729 | 11/1983 | Scoggins et al. | 528/388 |
| 4,524,200 | 6/1985 | Sherk et al. | 528/388 |
| 4,645,826 | 2/1987 | Iizuka et al. | 525/537 |
| 4,789,729 | 12/1988 | Nagira et al. | 528/496 |
| 5,071,947 | 10/1991 | Nakamura et al. | 528/388 |

FOREIGN PATENT DOCUMENTS

| | | |
|---|---|---|
| 453368 | 2/1970 | Japan . |
| 52-12240 | 4/1977 | Japan . |
| 57334 | 1/1982 | Japan . |
| 59-1536 | 1/1984 | Japan . |
| 61-7332 | 1/1986 | Japan . |
| 61-66720 | 4/1986 | Japan . |
| 62-232437 | 10/1987 | Japan . |
| 2102228 | 4/1990 | Japan . |
| 2163125 | 6/1990 | Japan . |

*Primary Examiner*—John C. Bleutge
*Assistant Examiner*—Helen F. Lee
*Attorney, Agent, or Firm*—Sughrue, Mion, Zinn, Macpeak & Seas

[57] ABSTRACT

Fractional refining of crude polyarylene sulfides as synthesized provide refined polyarylene sulfides exhibiting improved mechanical properties. A reaction mixture liquor comprising a crude product polyarylene sulfide in an organic amide medium is subjected to distillation for removal of the amide medium. Then the residue is leached with a hot solvent so as to recover a higher molecular weight fraction (solid) and discard a lower molecular weight fraction (liquid).

6 Claims, No Drawings

REFINING OF POLYARYLENE SULFIDES

This is a Continuation of Application Ser. No. 07/928,024 filed Aug. 11, 1992, now abandoned.

BACKGROUND OF THE INVENTION

1. Field of the Invention

This invention relates to a method for recovery of polyarylene sulfides from a reaction mixture after synthesis, and in particular, to a method for refining polyarylene sulfides as synthesized.

Because of their excellent heat resistance and chemical resistance properties, polyarylene sulfides have drawn a good deal of attention as materials for preparing electrical and electronic parts, automotive parts and the like.

Polyarylene sulfides are moldable or shapable into various articles such as parts, films, fibers, etc. by means of, for example, injection molding and extrusion molding techniques and have been employed in a variety of fields where their heat resistance and chemical resistance properties are desired or favored.

2. Prior Art

One of the typical processes for producing polyarylene sulfides is disclosed in Japanese Patent Publication (KOKOKU) No. 45-3368, which comprises reacting a dihalo-aromatic compound with an alkali metal sulfide, such as sodium sulfide, in an organic amide solvent, such as N-methyl pyrrolidone.

Since there is a general tendency that the polyarylene sulfides produced by such a process have relatively low molecular weights resulting in relatively poor mechanical properties, it have been proposed to prepare polyarylene sulfides having increased molecular weights by means of modified polymerization processes, for example in Japanese Patent Publications (KOKOKUs) Nos. 52-12240 and 57-334 and Japanese Patent Public Disclosures (KOKAIs) Nos. 61-7332 and 61-66720. However, a polyarylene sulfide product synthesized by such a modified process contains not only molecules of increased molecular weights but also molecules of little or not increased molecular weights. The presence of the lower molecular weight fraction appears to arrest development of improved mechanical properties which, otherwise, could be achieved by the higher molecular weight fraction.

Japanese Patent Public Disclosure (KOKAI) No. 59-1536 discloses a typical method for refining polyarylene sulfide in which water or the like-is added to the polymerization system so as to recover the polyarylene sulfide in the form of particultes. Again the thus recovered polyarylene sulfide is not sufficiently freed from the low molecular weight molecules to provide satisfactory mechanical properties.

Japanese Patent Public Disclosure (KOKAI) No.62-232437 discloses a method in which a polymerized slurry containing a polyarylene sulfide is filtered at temperatures in the range of from 50° C. to the boiling point of the slurry. It is difficult to filter the polymerized slurry as such. Therefore, in practical application, it is necessary to dilute the polymerized slurry with a large amount of expensive solvent that is the sane as the solvent used in the preceding polymerization stage. Employment of such a high degree of dilution will disadvantageously lower the, productivity of process. Even if an undiluted or neat slurry from the preceding polymerization stage can be filtered, this will not provide a satisfactorily refined polyarylene sulfide.

SUMMARY OF THE INVENTION

An object of the invention is to provide a method refining a synthesized polyarylene sulfide by removing a low molecular weight fraction therefrom.

A further object of the invention is to provide such a refining method that can be conducted at an acceptable productivity.

Another object of the invention is to provide a method for refining a synthesized crude polyarylene sulfide to give a refined polyarylene sulfide exhibiting improved mechanical properties.

A still further object of the invention is to provide a method for efficiently separating a crude polyarylene sulfide into a relatively low molecular weight fraction and a relatively high molecular weight fraction.

A further object of the invention is to provide a refined polyarylene sulfide resin improved in the mechanical strength properties.

Accordingly, the invention provides a method refining a crude polyarylene sulfide product that has been produced by a type of polyarylene sulfide synthesis processes employing an organic amide as a polymerization medium which method uses an appropriate solvent for refining polyarylene sulfide and comprises at least two stages of:

(i) heating a polymerization solution or slurry from said type of polyarylene sulfide synthesis so as to distill off the organic amide medium and recover a crude polyarylene sulfide product, and (ii) combining the recovered polyarylene sulfide with an appropriate solvent and heating the mixture to a temperature of not less than 100 ° C. but below the temperature at which the polyarylene sulfide product becomes completely dissolved in the solvent, while allowing a lower molecular weight fraction of the crude product to dissolve in the solvent and then subjecting the hot mixture to solid/liquid separation so as to recover the solid phase comprising a refined polyarylene sulfide product.

DETAILED DESCRIPTION OF THE INVENTION

The invention will be described in more detail with reference to the preferred embodiments.

The polyarylene sulfides which may be refined by the invention are those that have been synthesized by any one of the known processes.

Generally, polyarylene sulfides are prepared by reacting a sulfur source, such as an alkali metal sulfide, with a polyhaloaromatic compound, such as a dihaloaromatic compound, in an organic amide solvent.

Examples of the polyarylene sulfides which may be used in the invention include polyphenylene sulfide, polyphenylene sulfide sulfone, polyphenylene sulfide ketone and the like. Preferably, polyphenylene sulfide is used.

In the present refining method, it is essential that stage (i) comprises heating a liquor or slurry fed from a polyarylene sulfide synthesis process at a temperature sufficient to distill off the solvent that has been used the polyarylene sulfide synthesis process and recovering the residue comprising a crude polyarylene sulfide.

By the removal of polymerization solvent by means off the thermal distillation, the bulk density of the recovered polyarylene sulfide is increased higher than that of a similar polyarylene sulfide that is recovered conventionally, for example by sedimentation with water or the like.

By using the polyarylene sulfide of an increased bulk density, it is possible to employ a correspondingly increase concentration of the polyarylene sulfide in the treatment with solvent in the extraction or leaching of stage (ii). This will significantly contribute to enhancement of the throughput.

In stage (ii) of the invention, the concentration in which the polyarylene sulfide is subjected to the hot-fractionation is greater than 100 g, preferably greater than 250 g, of polyarylene sulfide per liter of the fractionating solvent. In the case where the concentration is less than 100 g/l, although the fractionation can be satisfactorily conducted, there is a problem that the throughput may be lowered to a level unacceptable in the commercial practice.

In stage (ii) of the invention, the temperature at which the low molecular weight fraction is allowed to dissolve in the solvent is above 100° C. but below the temperature at which the polyarylene sulfide becomes completely dissolved in the solvent, preferably above 190° C. but below the dissolution temperature, and especially above 210° C. but below 230° C. The term "dissolution temperature" means a temperature at which not only the low molecular fraction but the high molecular weight fraction of the crude polyarylene sulfide become completely dissolved in the solvent.

If the treatment temperature is less than 100° C., the dissolution of the low molecular weight fraction into the solvent is insufficient to achieve satisfactorily the intended advantageous results. In the case where the treatment is effected above the "dissolution temperature", a solution containing both the low and high molecular weight fractions dissolved in the solvent is obtained and this solution should be cooled sufficiently to deposit the desired high molecular weight fraction while maintaining the undesired low molecular weight fraction in solution, prior to the recovery by means of solid/liquid separation. However, since the high molecular weight fraction deposited exhibits a very low bulk density, it will be necessary either to use a decreased concentration of polyarylene sulfide in the hot-dissolution treatment, or to dilute the liquor after the deposition of high molecular weight fraction, in order to facilitate the subsequent separation.

The refining solvent which may be used in the invention is any one that is capable of dissolving appropriately the undesired low molecular weight fraction of the raw polyarylene sulfide. Preferably, the solvent is an aprotic polar solvent. Preferred examples of the solvent which may be mentioned include N-methyl pyrrolidone. N-ethyl pyrrolidone, N-cyclohexyl pyrrolidone, N-methyl caprolactam. tetramethyl urea and the like and mixtures thereof.

The period of hot treatment suitably ranges from about 2 minutes up to about 2 hours after the hot treatment temperature has been achieved. A period of time as short as less than about 2 minutes wound be insufficient to dissolve the low molecular weight fraction to an effective extent. In the case where the treatment is effected for a period exceeding about 2 hours, there would be a risk that the polyarylene sulfide, in particular the high molecular weight fraction thereof, is decomposed or otherwise affected.

Provided that the particular advantages achieved by the combination of stages (i) and (ii) of the present method are not significantly reduced, the present method may include any auxiliary stage or step before stage (i), between stages (i) and (ii), or after stage (ii), if desired.

The recovery of the refined high molecular weight fraction may be effected by any suitable separation technique while maintaining the treated liquor at a high temperature that is appropriate for achieving a desired degree of fractionation.

The polyarylene sulfides which have been refined in accordance with the present method exhibits excellent mechanical properties. The refined polymers may be very easily formed into strong and tough films, sheets, fibers and the like. Further, the refined polymers may be molded into various moldings, for example by injection, extrusion, blow or rotary molding technique or the like. The thus produced moldings do not tend to crack, even if they are thick-walled.

The refined polyarylene sulfides of the invention may be filled with powder fillers, such as carbon black, calcium carbonate, silica, titanium oxide and the like, and/or with fibrous fillers, such as carbon fibers, glass fibers. asbestos fibers, polyaramide fibers and the like.

The refined polymers of the invention may be advantageously blended with one or more of polycarbonate, polyphenylene oxide, polysulfone, polyacetal, polyimide. polyamide, polyester, polystyrene, polyolefin and ABS resins and the like.

The invention will be described with reference to the following Examples that are presented only for illustrative purpose but not for limitation of the scope of invention.

In the Examples, the "melt viscosity" was determined in a KOHKA-type flow tester at a temperature of 300° C. and a shear rate of 200 sec.$^{-1}$ using an orifice of 2 mm length and 0.5 mm diameter.

REFERENCE EXAMPLE 1

Synthesis and the First Stage

A 50-liter autoclave; was charged with 14 liters of N-methyl pyrrolidone and raised to a temperature of 120° C. Then, 5,225 g of 2.8 hydrated sodium sulfide ($Na_2S.2.8H_2O$) was charged into the autoclave. The mixture was heated to 204° C. slowly over a period of two hours with stirring, while distillating off 1,140 g of water. Then the proportion of water remaining in the reaction system was about 1.23 per mole of the sodium sulfide.

The mixture was cooled to 140° C. and 5,852 g of p-dichlorobenzene was added thereto. The mixture was heated to 225° C. and allowed to polymerize for 2 hours at this temperature. Subsequently the mixture was raised to a temperature of 250° C. and allowed to polymerize for a further 3 hours at this temperature. Then the mixture was cooled down to 80° C. and, after addition of 1,807 g water, heated again to a temperature of 250° C. and allowed to polymerize for a further 5 hours. Upon completion of the polymerization procedure, the resulting polymer appeared as particles in the reaction mixture. Therefore, the water in the reaction system was distilled off and then the mixture was heated to 250° C. and held at this temperature for half an hour so as to dissolve the particulate polymer in the liquid phase. The polymer solution was cooled to 180° C. and the N-methyl pyrrolidone medium was removed at a reduce pressure of 2 mm Hg. The resulting residual mass was washed with water to give a polymer product. The polymer product had a melt viscosity of 2,500 poises.

REFERENCE EXAMPLE 2

Synthesis and the First Stage

A 50-liter autoclave was charged with 1.7 liters of N-methyl pyrrolidone, then heated to 120 ° C. and charged with 6,345 g of 2.8 hydrated sodium sulfide ($Na_2S.2.8H_2O$). The mixture was slowly heated to 204° C. over a period of 2 hours with stirring, while distillating off 1,386 g of water. Then the proportion of water remaining in the reaction system was about 1.23 per mole of the sodium sulfide.

After cooling the mixture to 140° C., 7,105 g of p-dichlorobenzene was added to the mixture, which was then heated to 225° C. and allowed to polymerize for 2 hours at 225° C. and then for 3 hours at 250° C. The resulting polymerized liquor was cooled to 180° C. and placed under a reduced pressure of 2 mm Hg so as to recover the N-methyl pyrrolidone solvent therefrom. The residue was washed with water to give a polymer product having a melt viscosity of 760 poises.

EXAMPLE 1

A 5-liter autoclave was charged with 3.6 liters of N-methyl pyrrolidone and 900 g of the polymer product of Reference Example 1. The mixture was heated to 190° C. and held at this temperature for 45 minutes. Subsequently, the autoclave, still hot, was vented and the contents were filtered by means of suction filtration using No. 2 filter paper so as to fractionate the polymer into a soluble fraction and an insoluble fraction.

The insoluble fraction was recovered, washed with warm water and dried in vacuo at 160° C. to give a refined polymer product in a quantity of 867.6 g (96.4% recovery). This product had a melt viscosity of 3,200 poises.

The recovered polymer was melt kneaded and pelletized through a twin-screw extruder. The resulting pellets were injection molded to prepare specimens. The molding conditions were a cylinder temperature of 300° C. an injection pressure of 800 kg/cm$^2$ and a mold temperature of 145° C.

The specimens were used in the tensile test in accordance with the method of ASTM 638 and in the impact test in accordance with the method of ASTM 256. The test results are set forth in Table 1. The refined polymer in accordance with the invention demonstrated excellent mechanical properties.

EXAMPLES 2

The procedure as described in Example 1 was repeated to hot-fractionate the polymer, except that a 200-mesh standard sieve was used in place of the No. 2 filter paper in the suction filtration stage. The refined polymer was recovered in a quantity of 840.4 g corresponding to a recovery of 95.7%. The polymer had a melt viscosity of 4,000 poises.

The results of the tests for mechanical properties are set forth in Table 1. The properties of the resulting polymer were excellent.

EXAMPLE 3

The procedure as described in Example 1 was repeated to hot-fractionate the polymer, except that a 42 mesh standard sieve was used in place of the No. 2 filter paper. the refined polymer was recovered in a quantity of 769.5 g corresponding to a recovery of 85.5 %.

The results of the tests for mechanical properties are set forth in Table 1. The properties of the resulting polymer were excellent.

EXAMPLE 4

The procedure as described in Example 1 was repeated to hot-fractionate the polymer, except that the fractionation temperature was 210° C. instead of 190° C. and a 42-mesh standard sieve was used in place of the No. 2 filter paper. The polymer was recovered in a quantity of 745.2 g corresponding to a recovery of 82.8%. The polymer had a melt viscosity of 5,900 poises.

The results of the tests for mechanical properties are set forth in Table 1. The properties of the resulting polymer were excellent.

EXAMPLE 5

The procedure as described in Example 1 was repeated using the polymer product of Reference Example 2 so as to hot-fractionate the same. The refined polymer was recovered in a quantity of 824 g corresponding to a recovery of 91.6%. The polymer had a melt viscosity of 1,200 poises.

The results of the tests for mechanical properties are set forth in Table 1. The properties of the resulting polymer were excellent.

EXAMPLE 6

The procedure as described in Example 1 was repeated using the polymer product of Reference Example 2 so as to hot-fractionate the same. In this Example, a 200-mesh standard sieve was used in place of the No. 2 filter paper in Example 1. The refined polymer was recovered in a quantity of 745.2 g corresponding to a recovery of 82.8%. The polymer had a melt viscosity of 1,300 poises.

The results of the tests for mechanical properties are set forth in Table 1. The mechanical properties of the resulting polymer were excellent.

EXAMPLE 7

The procedure as described in Example 1 was repeated using the polymer product of Reference Example 2 so as to hot-fractionate the same. In this Example, a fractionation temperature of 210 ° C. was employed and a 200-mesh standard sieve was used in place of the No. 2 filter paper. The refined polymer was recovered in a quantity of 736.2 g corresponding to a recovery of 81.8%. The polymer had a melt viscosity of 1,500 poises.

The results of the tests for mechanical properties are set forth in Table 1. The mechanical properties of the resulting polymer were excellent.

EXAMPLE 8

The procedure as described in Example 1 was repeated using the polymer product of Reference Example 2 so as to hot-fractionate the same. In this Example, the starting polymer was used in an increased amount of 1,100 g and the solvent N-methyl pyrrolidone was used in a decreased amount of 2.5 liters.

The refined polymer was recovered in a quantity of 1,017 g corresponding to a recovery of 92.5%. The polymer had a melt viscosity of 1,020 poises.

The results of the tests for mechanical properties are set forth in Table 1. In spite of the increased concentration of polymer that was used in the treatment, the mechanical properties of the resulting polymer were excellent.

EXAMPLE 9

The procedure as described in Example 1 was repeated using the polymer product of Reference Example 2 so as to hot-fractionate the same. In this Example, a lower temperature of 150° C. was used in the fractionation stage. The refined polymer was recovered in a quantity of 875 g corresponding to a recovery of 97.2%. The polymer had a melt viscosity of 920 poises.

The results of the tests for mechanical properties are set forth in Table 1. The mechanical properties of the resulting polymer were excellent.

COMPARATIVE EXAMPLE 1

A sample of the polymer product as such of Reference Example 1 was injection molded into specimens which were subjected to the tests for mechanical properties as described in Example 1. The results are set forth in Table 1.

COMPARATIVE EXAMPLE 2

A sample of the polymer product as such of Reference Example 2 was injection molded into specimens which were subjected to the tests For mechanical properties as described in Example 1. The results are set forth in Table 1.

COMPARATIVE EXAMPLE 3

The procedure as described in Example i was repeated using the polymer product of Reference Example 1 so as to fractionate the same. In the instant case, a lower fractionation temperature of 50° C. was employed and a 42-mesh standard sieve was used in place of the No. 2 filter paper.

The polymer was recovered in a quantity of 793.8 g corresponding to a recovery of 88.2%. The polymer had a melt viscosity of 2,800 poises.

The results of the tests for mechanical properties are set forth in Table 1.

COMPARATIVE EXAMPLE 4

The procedure as described in Example 1 was repeated using the polymer product of Reference Example 2 so as to fractionate the same. In the instant case, a fractionation temperature of 50° C. was employed and a 200-mesh standard sieve was used in place of the No. 2 filter paper. The polymer was recovered in a quantity of 747.9 g corresponding to a recovery of 83.1%. The polymer had a melt viscosity of 860 poises.

The results of the tests for mechanical properties are set forth in Table 1.

COMPARATIVE EXAMPLE 5

A 2-liter autoclave was charged with 150 g of the polymer product of Reference Example 2 and one liter of N-methyl pyrrolidone. The mixture was heated to 250° C. and held for 20 minutes at this temperature. Then the mixture was cooled to 180° C. and subjected to fractionation by means of suction filtration using a 200-mesh standard sieve. However, in spite of the lower loading of polymer per unit volume of the solvent than that in Example 6, the intended fractionation met with failure due to the fact that the polymer had been swelled by the solvent.

COMPARATIVE EXAMPLE 6

A 2-liter autoclave was charged with 680 ml of N-methyl pyrrolidone, heated to 120° C. and then charged with 254 g of 2.8 hydrated sodium sulfide. The mixture was slowly heated to 204° C. over a period of 2 hours with stirring, while distillating off 55 g of water. The mixture was cooled to 140° C. Then the proportion of water remaining in the reaction system was about 1.23 per mole of the sodium sulfide.

After cooling, the autoclave was further charted with 284 g of p-dichlorobenzene. The mixture was raised to a temperature of 225° C., stirred at this temperature for 2 hours and raised to 250° C. and allowed to polymerize for 3 hours at 250° C. Upon completion of the polymerization the autoclave, still hot, was vented and the remaining water was distilled off. Then the autoclave was cooled to 180° C. and the mixture was subjected to refining by means of suction filtration using No. 2 filter paper. However, it was impossible to successfully filter the mixture.

As above-illustrated, according to the invention, a polyarylene sulfide material as synthesized may be efficiently fractionated by removal of the lower molecular weight fraction therefrom so as to give a refined polyarylene sulfide product exhibiting excellent mechanical properties.

TABLE 1

|   | Treatment Temp. (C°) | Sieves | Polymer Recovery (%) | Tensile Elongation (%) | Tensile strength (kg/cm$^2$) | Izod impact strength (notched in the rear) (kg · cm/cm) |
|---|---|---|---|---|---|---|
| Example |   |   |   |   |   |   |
| 1 | 190 | No. 2 filter paper | 96.4 | 4.0 | 830 | 28 |
| 2 | 190 | 200 mesh | 95.7 | 4.1 | 870 | 30 |
| 3 | 190 | 42 mesh | 85.5 | 5.2 | 850 | 56 |
| 4 | 210 | 42 mesh | 82.8 | 8.1 | 855 | 82 |
| 5 | 190 | No. 2 filter paper | 91.6 | 3.9 | 850 | 24 |
| 6 | 190 | 200 mesh | 82.8 | 3.7 | 830 | 23 |
| 7 | 210 | 200 mesh | 81.8 | 5.5 | 870 | 38 |
| 8 | 190 | No. 2 filter paper | 92.5 | 3.6 | 810 | 20 |
| 9 | 150 | No. 2 filter paper | 97.2 | 3.4 | 790 | 19 |
| Comp. Ex. |   |   |   |   |   |   |
| 1 | — | — | — | 2.9 | 750 | 20 |
| 2 | — | — | — | 2.8 | 620 | 15 |
| 3 | 50 | 42 mesh | 88.2 | 3.1 | 780 | 22 |
| 4 | 50 | 200 mesh | 83.1 | 2.9 | 680 | 15 |

What is claimed is:

1. A method for refining a crude polyarylene sulfide product produced by a polyarylene sulfide synthesis process employing an organic amide as a polymerization medium, said refining method comprising at least the following steps:
   (i) heating a polymerization solution or slurry from said polyarylene sulfide synthesis to distill off the polymerization medium; and
   washing the residue with water to give a crude polyarylene sulfide product; and subsequently
   (ii) combining the crude polyarylene sulfide product with a fractionating solvent and heating the mixture to a temperature of at least 150° C., but below the temperature at which the polyarylene sulfide becomes completely dissolved in the solvent, to dissolve a lower molecular weight fraction of the polyarylene sulfide crude product in the solvent; and
   subjecting the hot mixture to solid/liquid separation to recover a solid phase comprising a refined polyarylene sulfide product.

2. A method according to claim 1 in which, in stage (ii), the polyarylene sulfide is present in a proportion of at least 100 g per liter of the refining solvent.

3. A method according to claim 1 in which the refining stage (ii) is effected at a temperature above 190° C. but below the dissolution temperature.

4. A method according to claim 1 in which the solvent used in stage (ii) is an aprotic polar solvent selected from the group consisting of N-methyl pyrrolidone, N-ethyl pyrrolidone, N-cyclohexyl pyrrolidone, N-methyl caprolactam and tetramethyl urea and mixtures thereof.

5. A method according to claim 1 in which the polyarylene sulfide is kept in contact with the refining solvent for a period of from about 2 minutes to about 2 hours at the hot treatment temperature.

6. A method according to claim 1 in which one or more auxiliary stages or steps are included before stage (i) and/or between stages (i) and (ii) and/or after stage (ii).

* * * * *